US00H002123H

(19) United States
(12) Statutory Invention Registration
Mollenhauer et al.
(10) Reg. No.: US H2123 H
(43) Published: Sep. 6, 2005

(54) MULTI-LAYER CASTING OF POLYMERIC MIRRORS FOR VISIBLE WAVELENGTH APPLICATIONS

(75) Inventors: David H. Mollenhauer, Beavercreek, OH (US); John D. Camping, Huber Heights, OH (US)

(73) Assignee: The United States of America as represented by the Secretary of the Air Force, Washington, DC (US)

(21) Appl. No.: 10/395,961

(22) Filed: Mar. 25, 2003

Related U.S. Application Data

(60) Provisional application No. 60/368,473, filed on Mar. 28, 2002.

(51) Int. Cl.[7] ..... B05B 5/00

(52) U.S. Cl. ..... 427/161; 359/883

(58) Field of Search ..... 427/512, 162, 427/164, 165, 168, 240, 346, 372.2, 379, 384, 385.5, 386, 387, 389.7, 161, 402, 407.1, 407.2, 409, 425; 359/838, 871, 883, 884, 900

(56) References Cited

U.S. PATENT DOCUMENTS 3,410,636 A * 11/1968 Herrick ..... 359/883
6,254,243 B1 * 7/2001 Scrivens ..... 359/883
6,565,975 B2 * 5/2003 Umehara et al. ..... 428/413

* cited by examiner

*Primary Examiner*—M. Thomson
(74) *Attorney, Agent, or Firm*—Bobby D. Scearce; Thomas L. Kundert

(57) ABSTRACT

A process for producing flat or parabolic mirrors for visible wavelength applications is described and includes the steps of casting onto a substrate of substantially the selected mirror shape a liquid polymer resin in multiple cured layers whereby the last applied layer has the selected mirror shape unaffected by topography flaws in the surface of the substrate. A reflective coating may then be applied to the last applied and cured resin layer.

7 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTI-LAYER CASTING OF POLYMERIC MIRRORS FOR VISIBLE WAVELENGTH APPLICATIONS

CROSS-REFERENCE TO RELATED APPLICATION

This application claims priority of the filing date of Provisional Application Ser. No. 60/368,473 filed Mar. 28, 2002, the entire contents of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to processes for producing mirrors, and more particularly to an improved process for producing flat or parabolic mirrors for visible wavelength applications using an innovative polymeric casting process.

Prior art processes for producing flat and/or parabolic mirrors (especially large aperture mirrors) for visible wavelength applications have long consisted essentially of rough machining a material (glass, metal or ceramic) to a desired surface shape, grinding to a refined shape, and polishing the surface to a final desired accuracy. These processes are typically expensive and labor intensive, and more recently developed processes have resulted in only incremental improvements in production time and cost. Recently, a process known as spin casting was applied to the production of high quality parabolic mirror systems at greatly reduced cost.

Spinning a contained liquid in a static gravity environment produces a parabolic surface. The spinning process was applied in the 20th century for producing mirrors first by Wood (*Astrophysical Journal,* 29, 164 (1908)) and later by Borra ("Liquid Mirrors," *Scientific American* (Feb. 1994), and "The Case for Liquid Mirrors in Orbiting Telescopes," *Astrophyical Journal,* 392(1) (Jun. 1992)); Gibson ("Liquid Mirror Telescopes: History," *Journal of the Royal Astronomical Society of Canada,* 85(4) (Aug. 1991); and Borra et al, "Liquid Mirrors: Optical Shop Tests and Contributions to the Technology," *Astrophysical Journal,* 393(2) (July 1992)). The parabolic mirrors were produced using liquid mercury as a reflective liquid and demonstrated excellent surface characteristics, but required the mirror system to remain spinning and pointing only directly upwardly and depended on the use of (highly toxic) mercury. More recently, Alvarez et al ("Large Off-Axis Epoxy Paraboloids for Millimetric Telescopes and Optical Light Collectors," *Review of Scientific Instruments,* 64(1) (Jan. 1993)) used a polymer resin to spin-cast a 1.75 meter diameter infrared telescope mirror. The mirror had a surface accuracy of 25 microns ($\mu$m) RMS and was adequate for the desired application. The Steward Observatory Mirror Laboratory of the University of Arizona successfully produced large glass mirrors using the spin-casting method in which a spinning furnace is used to melt the glass and promote a parabolic shape. The surface is, however, inadequate for visual wavelength applications and requires labor and time intensive grinding and polishing.

The invention solves or substantially reduces in critical importance problems with prior art processes for producing mirrors as just described by spin casting or settle casting a liquid polymer resin onto a rigid or semi-rigid substrate. The resin becomes the mirror surface and the substrate provides the rigidity to support visual wavelength mirrors. In the settling process, the liquid resin is applied to a substantially flat substrate in a uniform acceleration (gravity) environment, and results in a flat mirror surface upon resin solidification. In spin casting, the liquid resin is applied to a substrate having substantially parabolic shape while the substrate is spinning about a vertically aligned axis, and results in a parabolic mirror surface upon resin solidification. Spinning the liquid resin produces a parabolic surface regardless of the underlying substrate surface geometry, and the surface shape of the polymer resin is retained after cure. A reflective coating may then be applied to the solid resin surface to define the desired parabolic reflector.

According to a principal feature of the invention, multiple layers of resin are applied to the substrate because resin shrinkage during solidification and cure causes the finished mirror surface to mimic topographic flaws in the surface of the substrate. If shrinkage is small, the mimicked flaws are smaller than the flaws on the substrate. Additional layers of resin reduce the topography of the flaws until the desired surface accuracy is achieved. The multi-layering aspect of the invention obviates any need for expensive machining to achieve optical tolerances and therefore greatly reduces the cost of producing flat or parabolic mirrors.

It is a principal object of the invention to provide an improved process for producing flat or parabolic mirrors.

It is a further object of the invention to provide a process for producing mirrors by casting a liquid polymer resin.

It is another object of the invention to provide an improved process for producing mirrors from liquid polymer resins using a spin casting process.

It is yet another object of the invention to provide a process for producing mirrors in a wide size range having a high degree of surface accuracy.

It is yet another object of the invention to provide a process for producing optical quality mirrors without the need for substantial final polishing.

It is yet another object of the invention to provide a low cost process for producing mirrors of high optical quality.

It is another object of the invention to provide a process for producing lightweight mirrors.

These and other objects of the invention will become apparent as a detailed description of representative embodiments proceeds.

SUMMARY OF THE INVENTION

In accordance with the foregoing principles and objects of the invention, a process for producing flat or parabolic mirrors for visible wavelength applications including the steps of casting onto a substrate of substantially the selected mirror shape a liquid polymer resin in multiple cured layers whereby the last applied layer has the selected mirror shape unaffected by topography flaws in the surface of the substrate. A reflective coating may then be applied to the last applied resin layer.

DESCRIPTION OF THE DRAWINGS

The invention will be more clearly understood from the following detailed description of representative embodiments thereof read in conjunction with the accompanying drawings wherein.

DETAILED DESCRIPTION

A discussion of technology related to the underlying principles of the invention may be found in "Multi-layered Polymer Mirror Experiment," by D. H. Mollenhauer and J. D. Camping, *Proceedings of the 42nd AIAA/ASME/ASCE/AHS/ASC Structures, Structural Dynamics, and Materials Conference,* 2001-1341 (Seattle, April 2001), and "Multi-Layered Polymer Mirror Experiment," by D. H. Mollenhauer and J. D. Camping, *Journal of Spacecraft and Rockets* 39 (5), 691–694 (Sep. 2002),the entire contents and teachings of which are incorporated by reference herein.

Producing a polymer cast mirror onto a rigid substrate can be accomplished in a number of non-unique ways, such as by pouring resin into a static or spinning substrate that can be constructed of a variety of suitable materials. The surface topography of the substrate, however, will quilt through to the finished surface of the polymer mirror as a consequence of cure shrinkage of the resin system. Two distinct effects of polymer cure shrinkage occur in this process. The primary quilt through process results from linear cure shrinkage in a direction perpendicular to the surface. An original flaw height h (FIG. 1*a*) might become flaw height $h^i$ (FIG. 1*b*) according to Eq (1), $$h^i = A*h \tag{1}$$

where A is a factor related to the linear cure shrinkage of the polymer casting resin. A secondary quilt through effect occurs because of the in-plane linear cure shrinkage, which places the polymer resin material into a state of tensile stress. A tensile stress in most materials reduces the thickness of the material in the direction transverse to the tensile loading (Poisson's effect). An original flaw height h might become a flaw height $h^{ii}$ according to Eq (2), $$h^{ii} = B*h \tag{2}$$

where B is a constant based on Poisson's Ratio of the polymer material and the state of tensile residual stresses caused by the in-plane linear cure shrinkage. The combination of these effects produces a composite quilt through flaw height $h^{iii}$ according to Eq (3).

$$h^{iii} = (A+B)*h \tag{3}$$

If (A +B) is less than 1, the overall flaw height is reduced, and, consequently, a second layer of resin cast over the cured first layer will produce a flaw height of $h^{iv}$ according to Eq (4), $$h^{iv} = (A+B)^2*h \tag{4}$$

thus reducing the flaw height by the square of (A +B). It follows that n layers of resin will produce a final flaw height of $h^v$ according to Eq (5).

$$h^v = (A+B)^n*h \tag{5}$$

Additional resin layers result in a further decreased flaw height if (A +B) is less than 1. Any number of resin layers may be applied as necessary to achieve the desired surface quality.

Figure 1A:
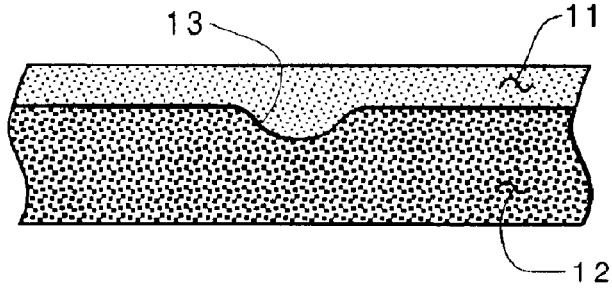
FIG. 1*a* is a schematic cross sectional view of a liquid resin layer on a substrate having a topography flaw.
Figure 1B:
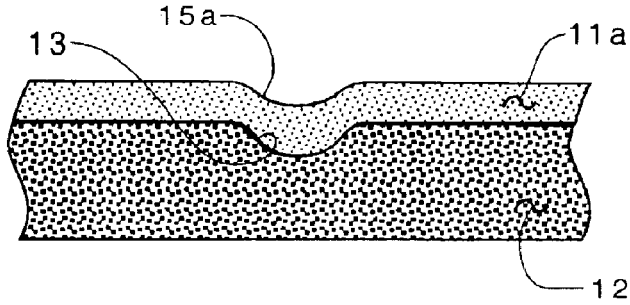
FIG. 1*b* is a schematic cross sectional view of the cured resin layer of FIG. 1*a* illustrating the reduced topography flaw.
Figure 1C:
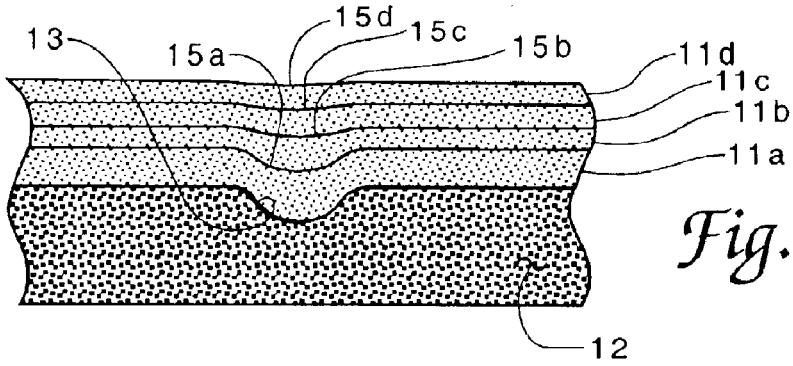
FIG. 1*c* is a schematic cross sectional view of multiple cured resin layers according to the invention illustrating the substantial elimination of the flaw topography of the substrate.

Multi-layer casting according to an aspect of the invention was demonstrated by settle-casting two different flat mirrors with resin layers (see Mollenhauer et al, supra). Referring now to the drawings, FIG. 1*a* shows a schematic cross sectional view of a resin layer 11 on a substrate 12 having a topography flaw 13 of height h. FIG. 1*b* shows a schematic cross sectional view of the cured resin layer 11*a* corresponding to the liquid resin layer 11 of FIG. 1*a*. The reduced topography flaw 15*a* of height $h^i$ in the resin layer following cure is illustrative of the effect taught by the invention. In FIG. 1*c* is shown a schematic cross sectional view of multiple cured resin layers 11*a–d* according to the invention illustrating successively reduced height topography flaws 15*a–d* and showing substantial elimination of the flaw topography of the substrate with the cure of the last applied resin layer 11*d*.

Figure 2:
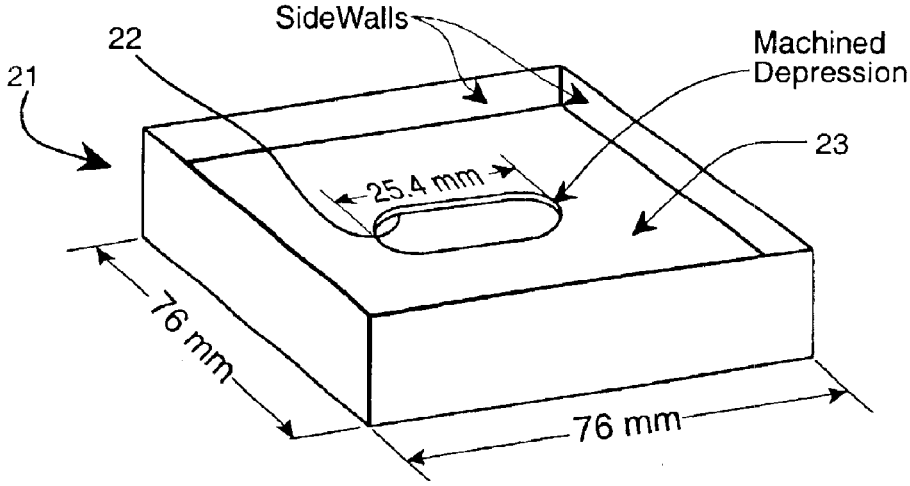
FIG. 2 is a schematic perspective view of an aluminum substrate having a machined surface depression in the demonstration of the invention in applying multiple cured resin layers.

Referring now to FIG. 2, illustrated therein is a schematic perspective view of an aluminum substrate 21, approximately 76 mm by 76 mm and about 12.7 mm thick, having a machined surface depression 22, about 25.4 mm long by 9.5 mm wide by approximately 0.20 mm deep, in an upper surface 23 thereof that was used in experiments demonstrating the utility of multiple cured resin layers applied in accordance with the invention to a substrate having surface topographical flaws.

Figure 3A:
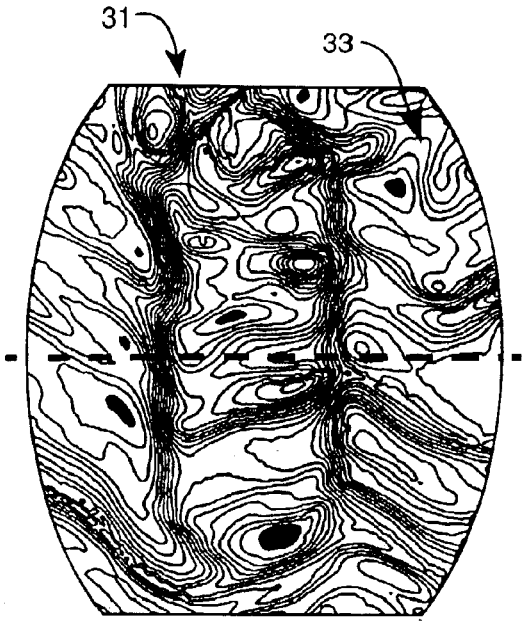
FIGS. 3*a* and 3*b* show Twymon-Greene fringe pattern results for a first resin layer applied to a substrate of FIG. 2 in the preparation of a first mirror in demonstration of the invention.
Figure 3B:
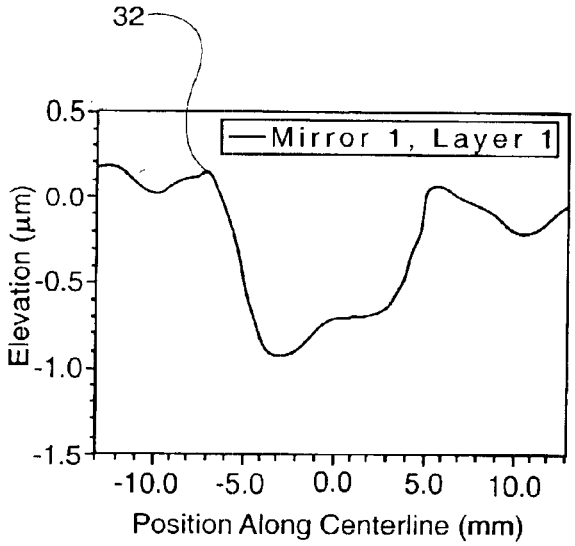
Figure 3C:
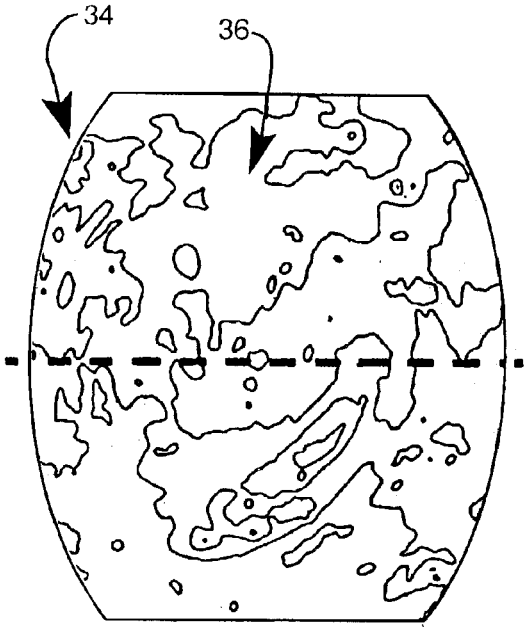
FIGS. 3*c* and 3*d* show Twymon-Greene fringe pattern results for a second resin layer applied to the first mirror of FIGS. 3*a* and 3*b;*
Figure 3D:
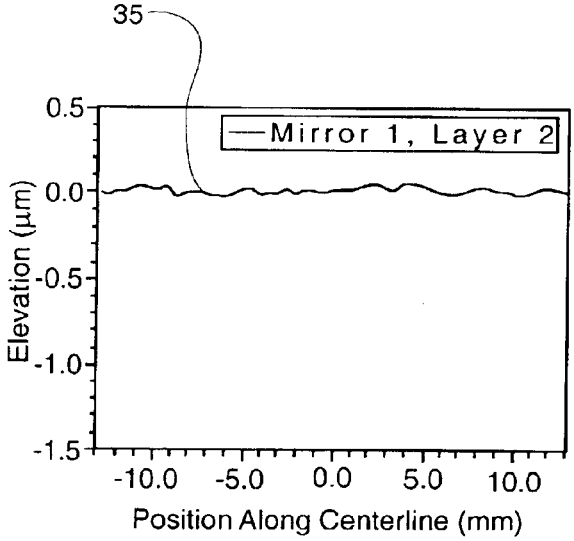
Figure 4A:
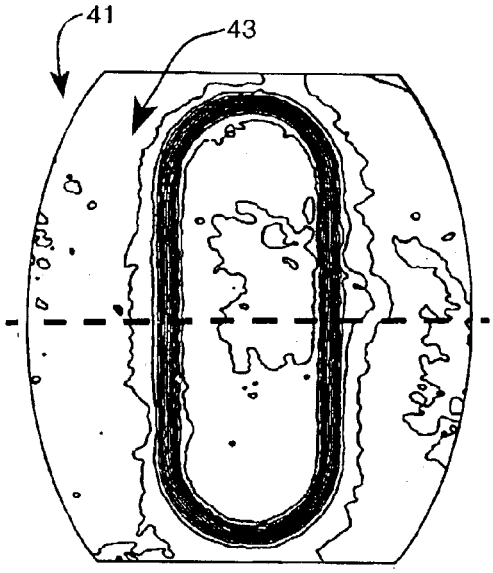
FIGS. 4*a* and 4*b* show Twymon-Greene fringe pattern results for a first resin layer applied to a substrate of FIG. 2 in the preparation of a second mirror in demonstration of the invention.
Figure 4B:
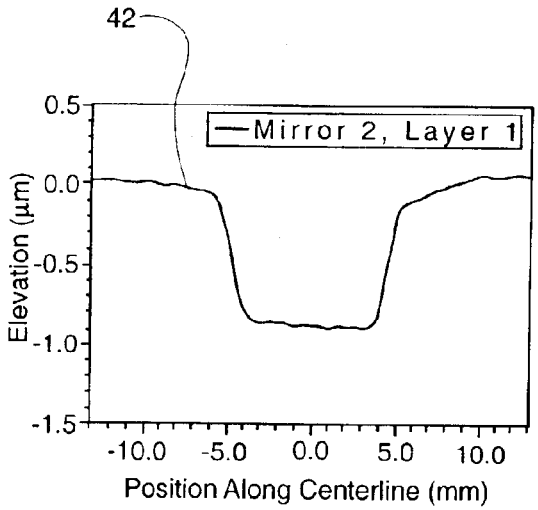
Figure 4C:
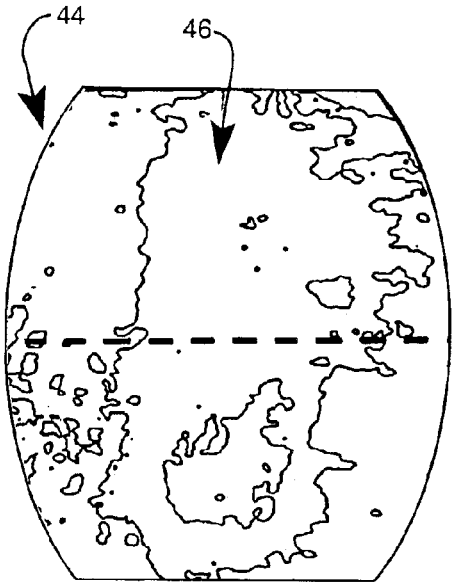
FIGS. 4*c* and 4*d* show Twymon-Greene fringe pattern results for a second resin layer applied to the second mirror of FIGS. 4*a* and 4*b*.
Figure 4D:
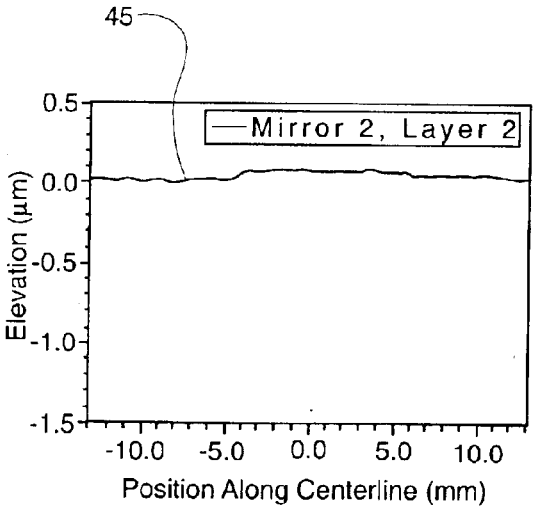

FIGS. 3*a,b* show Twymon-Greene fringe pattern 31 results and surface contour 32 for a first resin layer 33 applied to a substrate of FIG. 2 in the preparation of a first mirror in demonstration of the invention. FIGS. 3*c,d* show the corresponding Twymon-Greene fringe pattern 34 results and surface contour 35 for a second resin layer 36 applied to the first mirror of FIGS. 3*a,b*. FIGS. 4*a,b* show Twymon-Greene fringe pattern 41 results and surface contour 42 for a first resin layer 43 applied to a substrate of FIG. 2 in the preparation of a second mirror in demonstration of the invention. FIGS. 4*c,d* show the corresponding Twymon-Greene fringe pattern 44 results and surface contour 45 for a second resin layer 46 applied to the second mirror of FIGS. 4*a,b*. Each of the mirrors of FIGS. 3 and 4 used a substrate of aluminum structured as shown in FIG. 2. It is noted, however, that the substrate may comprise substantially any material as would occur to the skilled artisan practicing the invention, material selection not considered limiting in any way of the invention otherwise disclosed and claimed herein.

Resin selection may be made by one skilled in the art and is not considered limiting of the invention as described herein and defined in the appended claims. Desired characteristics of a selected resin system include the ability to produce a locally smooth surface upon solidification, low cure shrinkage, and uniformity of shrinkage throughout the volume of the resin. Accordingly, thermosetting resins such as epoxies, silicone rubbers, cyanate esters, polyesters, polyimides, and acrylics, and thermoplastic resins such as polyether ether ketone (PEEK), and UV or electron beam cured versions of the above resin systems may be selected as suitable for use in the practice of the invention. The resin may be applied using any suitable means such as pouring, spraying, powder melt, film melt or other conventional process, the specific selected process also not considered limiting of the invention.

The resins are typically applied in layer thicknesses of about 0.001 to 2 mm. Contour intervals for the fringe patterns of FIGS. 3*a,c* and 4*a,c* are typically $\lambda/10$ where $\lambda$ is the wavelength of light used to produce the fringe pattern ($\lambda$=632.8 nm).

Silicone rubber resin (General Electric RTV-615) was used in the demonstration castings just described. One resin layer poured over an aluminum plate with an 0.18 mm topography flaw produced a mirror surface with an average 0.00073 mm topography flaw. A resin layer poured onto another substrate with the 0.25 mm flaw produced a mirror surface with a 0.00098 mm flaw. The average flaw height reduction was about 99.6%, which indicates for this demonstration the factor (A +B) in Eq (5) is 0.004. A second resin layer should reduce this further by another 99.6%. She experimentally measured second layers showed essentially flaw elimination, the flatness exceeding measurement capabilities.

Figure 5:
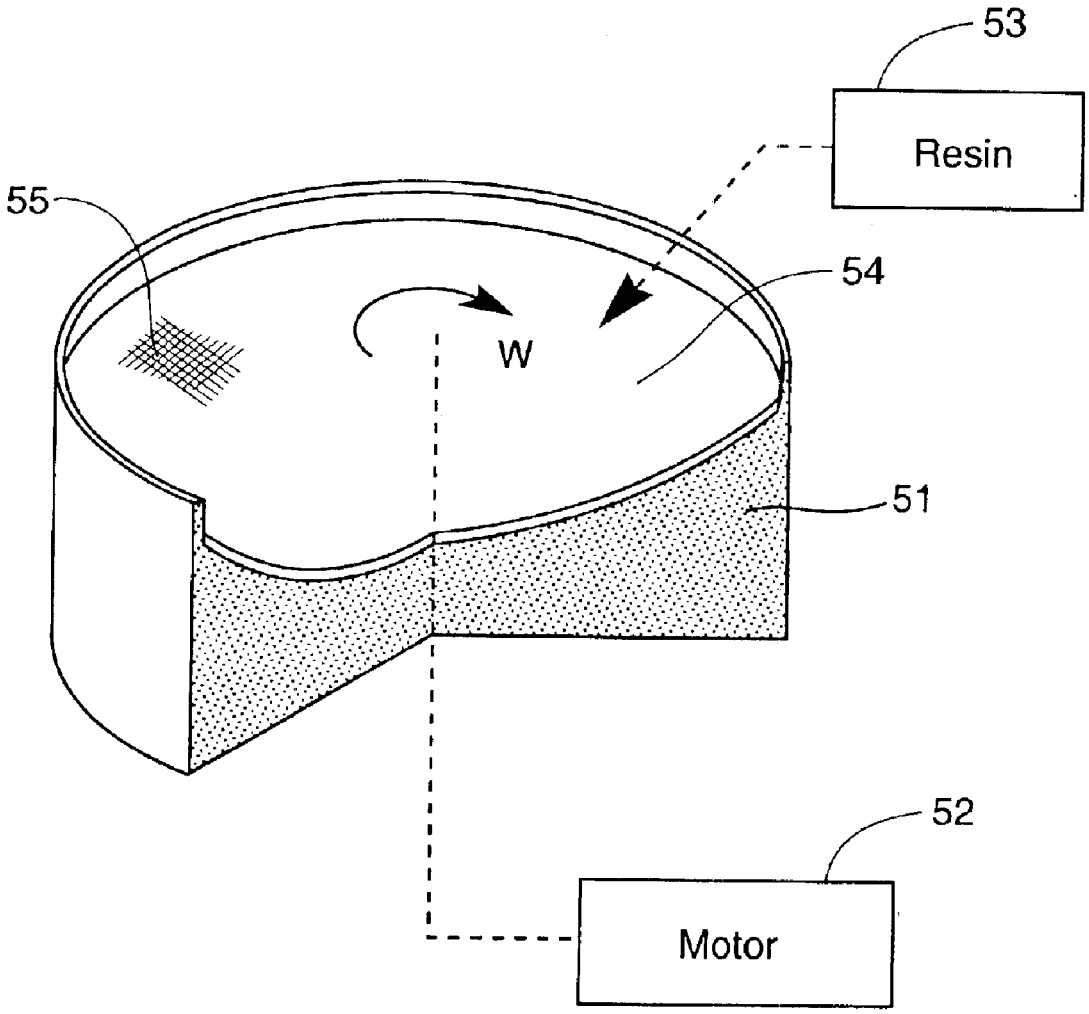
FIG. 5 is a schematic view in axial section of a parabolic shaped substrate for illustrating spin casting of resin according to the invention for the preparation of a parabolic mirror.

Referring now to FIG. 5, shown therein is a schematic view in axial section of a parabolic shaped substrate 51 for illustrating spin casting of resin according to the invention for the preparation of a parabolic mirror. Substrate 51 may be rotated at selected uniform speed w using conventional motor means 52 operatively connected to substrate 51. Resin is applied to the inner surface of substrate 51 from a source of resin 53 to produce a layer 54 of resin that is spread over the inner surface of the substrate under the influence of the substrate rotation. The resin is allowed to cure during rotation of the substrate and results in a parabolic shaped surface with reduced surface flaws as compared to the inner surface of the substrate. One or more additional resin layers may be applied to the first applied layer to further eliminate surface flaws in manner similar to that described above in the preparation of flat mirrors according to the invention. Reflective coating 55 of any suitable metal may be applied conventionally to the last applied resin layer to produce a mirrored surface.

The multi-layer casting process defined by the invention greatly reduces the production time and cost to manufacture visual wavelength parabolic and flat mirror systems. No grinding and little or no polishing is required to quickly produce a low cost rigid substrate by conventional machining or molding processes to reasonable tolerances. The necessary number of resin layers is then cast onto the substrate to produce the desired surface accuracy. The invention is also advantageous in the production of off-axis parabolic mirrors. Off-axis telescope systems are advantageous in avoiding contrast reduction imposed on the telescope by a secondary reflecting mirror or prime focus imaging system that blocks part of the light from the image.

The entire contents and teachings of all references cited herein are hereby incorporated by reference herein.

The invention therefore provides a process for producing multi-layered flat or parabolic mirrors of substantially any size for visible wavelength applications using polymeric casting. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

We claim:

1. A process for producing a polymeric mirror for visible wavelength applications, comprising the steps of:

(a) providing a source of liquid polymeric material;

(b) providing a substrate for supporting a mirrored surface of preselected shape;

(c) casting a first layer of said liquid polymeric material onto said substrate and curing said first layer; and said first layer; and (d) casting at least one additional layer of said liquid polymeric material onto said first layer, and curing each said additional layer prior to casting a subsequent layer thereon.

2. The process of claim 1 wherein said substrate is substantially flat.

3. The process of claim 1 wherein said substrate is substantially parabolic in shape.

4. The process of claim 3 further comprising the step of rotating said substrate about an axis through said parabolic shape during cure of said polymeric material whereby said liquid polymeric material assumes the said parabolic shape of said substrate.

5. The process of claim 1 wherein said liquid polymeric material is cast onto said substrate by one of pouring, spraying, powder melt and film melt.

6. The process of claim 1 wherein each said layer is cast to a thickness of about 0.001 to 2 mm.

7. The process of claim 1 further comprising the step of applying a metallic reflective coating onto the last applied and cured layer of said polymeric material.

* * * * *